United States Patent Office 3,356,754
Patented Dec. 5, 1967

3,356,754
PREPARATION OF LIQUID POLYMERS OF STYRENE AND BUTADIENE
Clinton F. Wofford, Bartlesville, Okla., assignor to Phillips Petroleum Company, a corporation of Delaware
No Drawing. Filed Oct. 5, 1964, Ser. No. 401,654
The portion of the term of the patent subsequent to Dec. 27, 1983, has been disclaimed and dedicated to the Public
19 Claims. (Cl. 260—669)

ABSTRACT OF THE DISCLOSURE

Liquid polymers are obtained by the polymerization of conjugated dienes alone or in admixture with another conjugated diene or vinyl-substituted aromatic hydrocarbon in the presence of a catalyst formed on mixing (1) an organolithium compound and (2) an organic compound of an alkali metal selected from the group consisting of potassium, rubidium and cesium, if at least 30 weight percent of the diluent employed is an alkyl-substituted aromatic hydrocarbon.

This invention relates to a process for the polymerization of olefinic compounds. In one aspect the invention relates to polymerization of conjugated dienes alone or in admixture with another conjugated diene or vinyl-substituted aromatic compound. In another aspect this invention relates to the formation of liquid polymer products by carrying out the polymerization in the presence of an alkyl-substituted aromatic compound.

Catalysts formed on mixing an organolithium compound with an organic compound of an alkali metal other than lithium can be employed for the production of conjugated diene homopolymers and random copolymers of conjugated dienes with vinyl-substituted aromatic hydrocarbons. This process is described in a copending application of C. F. Wofford, Ser. No. 323,567, filed November 14, 1963 now U.S. Patent No. 3,294,768, of which this application is a continuation in part. In organometallic catalyst systems, it is common practice to regulate the molecular weight of the polymers by suitable adjustment of catalyst concentration. As the catalyst level is increased, the molecular weight of the polymer is decreased. Thus when it is desired to prepare liquid polymers, very high catalyst levels are generally required.

In accordance with the present invention I have discovered that the use of a diluent comprising at least 30 weight percent of an alkyl-substituted aromatic hydrocarbon avoids the high catalyst level necessary heretofore for the production of liquid polymers by the polymerization of a conjugated diene either alone or in admixture with another conjugated diene or a vinyl-substituted aromatic hydrocarbon with a catalyst which forms on mixing an organolithium compound and an organic compound of potassium, rubidium or cesium.

Thus it is an object of the present invention to provide a novel process for the formation of liquid polymers.

Another object of this invention is to provide a process for forming liquid polymers in a manner to avoid high catalyst level in the system.

Other and further objects and advantages of the invention will become apparent to those skilled in the art upon consideration of the following disclosure.

The present invention resides in the discovery that liquid polymers can be prepared through proper choice of the polymerization diluent without the necessity for using the high catalyst levels that are ordinarily required. Broadly speaking, the polymerization process of this invention comprises the step of contacting in a polymerization zone a conjugated diene, either alone or in admixture with another conjugated diene or a vinyl-substituted aromatic hydrocarbon, with a catalyst which forms on mixing (1) an organolithium compound and (2) an organic compound of potassium, rubidium, or cesium, and conducting the polymerization in the presence of a diluent comprising at least 30 weight percent of an alkyl-substituted aromatic hydrocarbon. The total diluent can be an alkyl-substituted aromatic hydrocarbon or it can be used in admixture with a paraffinic and/or a cycloparaffinic hydrocarbon. By the process of this invention liquid polymers of very low molecular weight can be easily prepared when the concentration of the organolithium component charged to the polymerization is no greater than is frequently utilized for the production of rubbery polymers. Since there are generally small amounts of impurities in the diluent and/or monomer(s), a portion of the organolithium compound serves as a scavenger with the remainder being utilized as an active initiator component.

The alkyl-substituted aromatic hydrocarbons preferred as diluents are the alkyl-substituted benzenes containing from 1 to 4 alkyl groups per molecule with the total number of carbon atoms in the alkyl groups not to exceed 8. Examples of these compounds include toluene, xylenes, 1,2,3-trimethylbenzene, 1,2,4-trimethylbenzene, 1,3,5-trimethylbenzene, 1,2,4,5 - tetramethylbenzene, 1-methyl-2-ethylbenzene, 2,4 - diethylbenzene, ethylbenzene, isopropylbenzene, 1-4-di - n - propylbenzene, 1,4-dimethyl-3-isopropylbenzene, 1-ethyl-2,5-di-n-propylbenzene, tert-butylbenzene, n-butylbenzene, 1,3-di-n-butylbenzene, amylbenzene, 1-amyl-2-isopropylbenzene, 1,2-dimethyl-4-n-hexylbenzene, and n-octylbenzene. As hereinbefore stated, the alkyl-substituted aromatic hydrocarbon can serve as the total diluent or it can be employed in admixture with aliphatic and cycloaliphatic hydrocarbon diluents. Examples of such diluents include propane, isobutane, n-pentane, isooctane, n-dodecane, cyclopentane, cyclohexane, methylcyclohexane, benzene, toluene, xylene, ethylbenzene, and the like. In the case of mixed diluents, at least 30 weight percent of the mixture is the alkyl-substituted aromatic hydrocarbon. As the quantity of alkyl-substituted aromatic hydrocarbon in the diluent mixture is increased, the molecular weight of the polymer is decreased. While this invention is not based upon any particular reaction mechanism, it is believed that the alkyl-substituted aromatic hydrocarbon functions as a chain transfer agent and thereby makes possible the production of low molecular weight polymers.

Organolithium compounds employed in preparing the catalyst of this invention correspond to the formula $R(Li)_x$ wherein R is a hydrocarbon radical selected from the group consisting of aliphatic, cycloaliphatic and aromatic radicals, and $x$ is an integer from 1 to 4, inclusive. The R in the formula preferably contains from 1 to 20 carbon atoms, although it is within the scope of the invention to use higher molecular weight compounds. Examples of organolithium compounds which can be used include methyllithium, isopropyllithium, n-butyllithium, sec-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,2-dilithio-1,2-diphenylethane, 1,2-dilithio-1,8-diphenyloctane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

As mentioned above, the other component employed in preparing the present catalyst is an organic compound of potassium, rubidium or cesium. These compounds are selected from the group consisting of compounds having the following formulas:

(1) R'M (2) R'(YM)$_n$ (3) 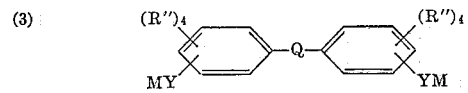

(4) 

(5) 

and (6) 

wherein R' is selected from the group consisting of aliphatic, cycloaliphatic and aromatic radicals, preferably containing from 1 to 20 carbon atoms, M is an alkali metal selected from the group consisting of potassium, rubidium and cesium, R'' is selected from the group consisting of hydrogen and aliphatic, cycloaliphatic and aromatic radicals, preferably containing from 1 to 6 carbon atoms, Q is selected from the group consisting of

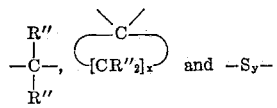

radicals, where R'' is as defined before, $x$ is an integer from 4 to 5, inclusive, and $y$ is an integer from 1 to 3, inclusive, R''' is selected from the group consisting of aliphatic, cycloaliphatic and aromatic radicals, preferably containing from 4 to 20 carbon atoms, Y is selected from the group consisting of oxygen and sulfur and $n$ is an integer from 1 to 3, inclusive. It is to be understood that the aliphatic and cycloaliphatic radicals mentioned above can be saturated or unsaturated.

Examples of organometal compounds corresponding to Formula 1 include the following: methylpotassium, ethylpotassium, n-propylrubidium, isopropylcesium, tert-butylpotassium, tert-amylpotassium, n-hexylpotassium, cyclohexylrubidium, eicosylcesium, 4-methylcyclohexylpotassium, 3-hexenylpotassium, 2,5-decadienylpotassium, 3-cyclopentenylrubidium, 4,6-di-n-butyldecylpotassium, 3,6-diphenyloctylpotassium, phenylpotassium, 1-naphthylpotassium, 4-tolylpotassium, benzylpotassium, 4-tert-butyl-6,7-diisopropyl-2-naphthylpotassium, and the like.

Formulas 2 and 3 define the alkali metal salts of mono- and polyhydric alcohols, mono- and polyhydric phenols, including bis-phenols, and sulfur analogs of the foregoing, that can be used in preparing the present catalyst system. Specific examples of compounds represented by Formula 2 include the potassium, rubidium and cesium salts of methyl alcohol, ethyl alcohol, n-propyl alcohol, isopropyl alcohol, tert-butyl alcohol, tert-amyl alcohol, n-hexyl alcohol, cyclohexyl alcohol, eicosyl alcohol, 2-butenyl alcohol, 4-methylcyclohexyl alcohol, 3-hexenyl alcohol, 2,5-decadienyl alcohol, 3-cyclopentenyl alcohol, 4,6-di-n-butyldecyl alcohol, 4,8-dodecadienyl alcohol, allyl alcohol, 1,3-dihydroxyhexane, 1,5,9-trihydroxytridecane, 1,6-dihydroxyoctane, 1,9,15-trihydroxypentadecane, benzyl alcohol, 3(4-tolyl)-propyl alcohol, phenol, catechol, resorcinol, hydroquinone, pyrogallol, 1-naphthol, 2-naphthol, 2,6-di-tert-butyl-4-methylphenol (Ionol), 2,4,6-tritert-butylphenol, 2,6-di-tert-butyl-4-phenylphenol, 2,6-di-sec-butyl-4-methylphenol, ethanethiol, 1-butanethiol, 2-pentanethiol, 2-isobutanethiol, benzenethiol (thiophenol), 1,12-dodecanedithiol, 5,9-di-n-propyl-1,14-tetradecanedithiol, 2-naphthalenethiol, cyclohexanethiol, 2,5-di-n-hexyl-6-tert-butylbenzenethiol 2,6-di-tert-butyl-4(4-tolyl)benzenethiol, 3-methylcyclohexanethiol, 2-naphthalenethiol, benzenemethanethiol, 2-naphthalenemethanethiol, 1,8-octanedithiol, 1,10-decanedithiol, 1,4-benzenedithiol, and the like. Specific examples of suitable compounds corresponding to Formula 3 are the potassium, rubidium and cesium salts of 2,2'-methylene-bis(4-methyl-6-tert-butylphenol), 2,2'-isopropylidene-bis(6-cyclohexyl-p-cresol), 4,4' - isopropylidene-bis(2,6 - dicyclohexyl-phenol), 4,4'-methylene-bis(2,6-diisopropylphenol), 2'2'-methylene-bis(6-benzyl-p-cresol), 2,2'-ethylidene-bis(5-isopropylphenol), 1,1-bis(4-hydroxyphenyl)cyclohexane, 1,1-bis[2-hydroxy-3-(3-tolyl)]cyclopentane, 2,2' - ethylidene-bis(4-ethyl-6 - tert - hexylthiophenol), 2,2' - propylidene-bis(3,5-dimethyl-6-cyclopentylthiophenol), 4,4'-thiobis(2,6-di-tert-butylphenol), 4,4'-dithio-bis(2-n-propyl-6-tert-butylphenol), 4,4'-trithio-bis(2-methyl-6 - isopropylphenol), and the like.

Specific examples of the alkali metal salts of mono- and polycarboxy acids and sulfur analogs as represented by Formula 4 include the potassium, rubidium and cesium salts of isovaleric acid, caprylic acid, lauric acid, myristic acid, palmitic acid, stearic acid, arachidic acid, oleic acid, ricinoleic acid, linoleic acid, linolenic acid, gadoleic acid, cyclopentanecarboxylic acid, dimethylcyclohexane-3,5-dicarboxylic acid, phenylacetic acid, benzoic acid, pimelic acid, azelaic acid, sebacic acid, phthalic acid, henedecane-1,11-dioic acid, 1,8,16-hexadecanetricarboxylic acid, 3,3,7,7-tetramethylnonane-1,5,9-tricarboxylic acid, 4-pentyl-2,5-heptadiene-1,7-dioic acid, 2-naphthoic acid, 1-naphthyleneacrylic acid, hexanethionic acid, 2,2-diethylbutanethiolic acid, decanethionic acid, tridecanethionothiolic acid, 4-tetradecanethionic acid, thiolbenzoic acid, thiono-1-naphthoic acid, and the like.

Specific examples of alkali metal carbonates and sulfur analogs as represented by Formula 5 include the potassium, rubidium and cesium salts of tert-butylcarbonic acid, n - hexylcarbonic acid, 3,5 - dimethylhexylcarbonic acid, n-dodecylcarbonic acid, 4,4 - diethylhexylcarbonic acid, 3,6-diphenyloctylcarbonic acid, 7-dodecenylcarbonic acid, 3-cyclohexenylcarbonic acid, phenylcarbonic acid, O-tert-amyl ester of thiolcarbonic acid, O-tridecyl ester of thiononcarbonic acid, O-eicosyl ester of thionothiocarbonic acid (xanthic acid), S-hexadecyl ester of dithiolcarbonic acid, S-(3-cyclohexenyl) ester of thiolcarbonic acid, phenyl ester of trithiocarbonic acid, and the like.

Specific examples of alkali metal salts of secondary amines as represented by Formula 6 include the potassium, rubidium and cesium salts of dimethylamine, di-n-butylamine, methyl-n-hexylamine, di(3,5 - diethyloctyl)-amine, di(8-phenyloctyl)amine, di(3-hexenyl)amine, diphenylamine, dibenzylamine, ethyl-4-tolylamine, n-propyl-n-eicosylamine, and the like.

It is to be understood that any one or more of the organic compounds of potassium, rubidium and cesium as represented by the formulas can be used with one or more of the R(Li)$_x$ compounds in forming the present catalyst system. Alkali metal derivatives of compounds having mixed functionality can also be employed with the R(Li)$_x$ compounds. Examples of such derivatives include the potassium, rubidium and cesium salts of 10-hydroxydecanoic acid, 8-mercapto-1-naphthoic acid, 1-hydroxy-14-mercapto-8-tetradecene, 1-hydroxy-9-mercaptopentadecanoic acid, 2-tert-butyl-6-mercapto-1-naphthoic acid, and the like.

The amount of the organolithium compound employed in forming the catalyst system will generally be in the range of 0.2 to 100 milliequivalents per 100 parts by weight of total monomers charged (e.g., gram milliequivalents per 100 grams of total monomers charged) with from 0.3 to 15 milliequivalents of organolithium compound per 100 parts by weight of monomer being preferred. In many instances an amount of organolithium compound less than 3 milliequivalents, often less than 2 milliequivalents per 100 parts by weight of monomers charged gives the desired results.

The relative quantities of organolithium compound and the organic compound of potassium, rubidium, or cesium can vary over a broad range. The amount of the organolithium compound will generally be in the range of 0.15 to 30 equivalents (based on lithium atoms) per equivalent of the organic compound of potassium, rubidium or cesium.

Monomers that are polymerized in accordance with the present process are selected from the group consisting of (1) at least one conjugated diene and (2) a mixture of conjugated dienes and vinyl-substituted aromatic hydrocarbons. Conjugated dienes that can be used preferably contain from 4 to 12 carbon atoms per molecule and include 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene. The vinyl-substituted aromatic hydrocarbons that can be employed include any vinyl-substituted aromatic hydrocarbon in which the vinyl group is attached to a nuclear carbon atom. It is to be understood that a compound having a substituent on the alpha carbon atom, such as alpha-methylstyrene, is not applicable to the practice of the instant invention. Examples of vinyl-substituted aromatic hydrocarbons which are often preferred are styrene, 1-vinylnaphthalene and 3-methylstyrene (3-vinyltoluene). Examples of other compounds which can be advantageously utilized include 3,5-diethylstyrene, 4-n-propylstyrene, 2,4,6-trimethylstyrene, 4-dodecylstyrene, 3-methyl-5-n-hexylstyrene, 4-cyclohexylstyrene, 4-phenylstyrene, 2-ethyl-4-benzylstyrene, 4-p-tolylstyrene, 3,5-diphenylstyrene, 2,3,4,5-tetraethylstyrene, 3-(4-n-hexylphenyl)styrene, 3-ethyl-1-vinylnaphthalene, 6-isopropyl-1-vinylnaphthalene, 3,6-di-p-tolyl-1-vinylnaphthalene, 6-cyclohexyl-1-vinylnaphthalene, 8-phenyl-1-vinylnaphthalene, 7-dodecyl-2-vinylnaphthalene, and the like.

The liquid polymers of this invention generally have an inherent viscosity below 0.55 and polymers can be readily prepared with an inherent viscosity below 0.40. They find utility as coatings for surfaces such as metals, as plasticizers for rubbers, and they can be blended with carboxy- and hydroxy-terminated liquid conjugated diene polymers to lower the viscosity of the latter polymers.

The process of this invention is applicable to the production of completely random copolymers of conjugated dienes and vinyl-substituted aromatic hydrocarbons. The amount of conjugated diene and vinyl-substituted aromatic hydrocarbon employed in the preparation of the completely random copolymers can vary over a rather wide range, e.g., from 5 to 95 parts by weight of conjugated diene and from 95 to 5 parts by weight of vinyl-substituted aromatic hydrocarbon, both based on 100 parts by weight of total monomers. It is to be understood that mixtures of conjugated dienes as well as mixtures of the vinyl-substituted aromatic hydrocarbons can be utilized in preparing the random copolymers.

The polymerization process of this invention can be carried out at any temperature within the range of about —80 to 150° C., but it is preferred to operate in the range of —20 to 80° C. The polymerization reaction can be carried out under autogenous pressures. It is usually desirable to operate at pressure sufficient to maintain the reaction mixture substantially in the liquid phase. The pressure will thus depend upon the particular materials being polymerized, the diluent employed, and the temperature at which the polymerization is carried out. However, higher pressures can be employed, if desired, these pressures being obtained by some such suitable method as the pressurization of the reactor with a gas which is inert with respect to the polymerization reaction.

The process of this invention can be carried out as a batch process by utilizing any suitable charging procedure, e.g., by charging the monomeric material into a reactor containing the catalyst and the diluent. In another method, the two catalyst components are charged separately to the reactor, either prior to or subsequent to the addition of the monomeric material and/or the diluent. It is also within the scope of the invention to preform the catalyst by mixing the two catalyst components in a liquid hydrocarbon, preferably the same as the polymerization diluent. It is also frequently advantageous to age the catalyst, particularly when the second component, i.e., potassium, rubidium or cesium compound is not readily soluble in the liquid hydrocarbon. In such cases, optimum results are obtained by aging the mixture at a temperature in the range of about 25° C. to 150° C. The aging time depends upon the temperature used and the solubility of the second catalyst component, but it is usually in the range of about 5 minutes to about 8 minutes. In some instances a much longer aging time is required, e.g., in the range of 1 to 100 hours, but times as long as 6 to 8 months can be utilized. The process can also be practiced in a continuous manner by maintaining the above-described concentrations of reactants in the reactor for a suitable residence time. The residence time in the continuous process will, of course, vary within rather wide limits depending upon such variables as reaction temperature, pressure, the amount of catalyst used and the monomeric materials being polymerized. In a continuous process the residence time generally falls within the range of 1 second to 1 hour when conditions within the specified ranges are employed. When a batch process is being utilized, the time for the reaction can be as high as 24 hours or more although it is generally less than 24 hours.

At the conclusion of the polymerization, the reaction mixture is treated in order to inactivate the catalyst and recover the polymer. It is generally preferred to add only an amount of a catalyst deactivating material, such as water or an alcohol, which is sufficient to deactivate the catalyst. It has also been found advantageous to add an antioxidant, such as phenylbeta-naphthylamine, 2,2'-methylene-bis(4-methyl-6-tert-butylphenol), or the like to the polymer solution prior to removal of the diluent although it can be added after the polymer has been recovered. Polymers can be recovered from solution by distillation or evaporation of the solvent.

A more comprehensive understanding of the invention can be obtained by referring to the following illustrative examples which are not intended, however, to be unduly limitative of the invention. Experimental methods used in determining the polymer properties given in the examples are:

*Percentage of various types of addition (polymer microstructure)*

The percentage of polymer formed by cis-1,4-addition, trans-1,4-addition, and 1,2-addition (vinyl) was determined by dissolving the polymer in carbon disulfide to form a solution having 25 grams of polymer per liter of solution, and then determining the infrared spectrum (percent transmission) of the solution.

The percent of the total unsaturation present in trans-1,4- was calculated according to the following equation and consistent units: $\epsilon = E/tc$ where $\epsilon$ = extinction coefficient (liters-mols$^{-1}$-centimeters$^{-1}$); E=extinction (log $I_o/I$); $t$=path length (centimeters); and $c$=concentration (mols double bond/liter). The extinction was determined at the 10.35 micron band and the extinction coefficient was 146 (liters-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimeters$^{-1}$).

The percent of the total unsaturation present as cis-1,4- was obtained by subtracting the trans-1,4- and 1,2- (vinyl) determined according to the above procedure from the theoretical unsaturation, assuming one double bond per each $C_4$ unit in the polymer.

Brookfield viscosity

This type of viscosity determination is made on liquid polymers by ASTM Method D–1824–61T.

Inherent viscosity

This type of viscosity determination is made on polymers ranging from liquid to rubbery consistency. For diene homopolymers and diene-vinyl-substituted aromatic copolymers inherent viscosities of less than about 0.3 are indicative of liquid polymers; those above about 0.3 and below about 1.5 are indicative of soft materials, sometimes designated as "semiliquid" or "semisolid"; and those above about 1.5 are indicative of rubbery polymers. For vinyl-substituted aromatic homopolymers inherent viscosities of greater than about 0.2 are indicative of solid materials.

One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

Percentage gel

The presence of gel is indicative of cross-linking, which can be undesirable.

Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

EXAMPLE I

Runs were conducted in which butadiene was polymerized in the presence of a catalyst formed on mixing n-butyllithium with potassium tert-butoxide (potassium salt of tert-butyl alcohol). Cyclohexane, hexane, and toluene were employed as diluents. In addition to being used in the catalyst system, butyllithium also served as a scavenger of catalyst-inactivating materials. The recipes were as follows:

|  | Parts by Weight | |
| --- | --- | --- |
|  | A | B |
| 1,3-butadiene | 100 | 75 |
| Styrene |  | 25 |
| Diluent | 800 | 800 |
| n-Butyllithium | 0.16 | [1] 0.16 |
| Potassium tert-butoxide | 0.028 | [2] 0.028 |
| Li/K mole ratio (based on materials charged) | 10/1 | 10/1 |
| Temperature | 158 | 158 |

[1] 2.5 mmoles.  [2] 0.25 mmole.

The diluent was charged first and then the butadiene. The initiator components in hexane were mixed and allowed to stand 40 minutes at room temperature (about 75° F.) prior to charging to the reactor. All runs were conducted in an atmosphere of nitrogen. In the polybutadiene runs, the reactions were terminated with a solution of 2,2'-methylene-bis(4-methyl - 6-tert-butylphenol) in a 50/50 volume mixture of toluene and isopropyl alcohol, using an amount sufficient to provide approximately one part by weight of the phenolic antioxidant per 100 parts by weight of polymer. Polymers prepared in cyclohexane and hexane were coagulated in isopropyl alcohol, separated and dried. The polymers prepared in toluene were recovered by evaporation of the diluent. In the butadiene/styrene runs, the reactions were shortstopped with isopropyl alcohol and the products were recovered by evaporation of the diluent. All polymers were gel free. Data are presented in Table I.

TABLE I

| Run No. | Diluent | Poly. Time, Minutes | Conv., Percent | Inh. Visc. | Bound Styrene, Percent [1] | Microstructure, Percent | | |
| --- | --- | --- | --- | --- | --- | --- | --- | --- |
|  |  |  |  |  |  | Cis | Trans | Vinyl |
| POLYBUTADIENE | | | | | | | | |
| 1 | Cyclohexane | 60 | 96 | 1.28 |  | 37.1 | 47.8 | 15.1 |
| 2 | Hexane | 90 | 95 | 1.30 |  | 36.3 | 49.1 | 14.6 |
| 3 | Toluene | 20 | Quant. | 0.18 |  | 29.2 | 41.1 | 29.7 |

BUTADIENE/STYRENE COPOLYMERS

| | | | | | | | | |
|---|---|---|---|---|---|---|---|---|
| 4 | Cyclohexane | 1 | 11.6 | 0.21 | 33.4 | | | |
| | Do | 2 | 25.5 | 0.35 | 34.5 | | | |
| | Do | 4 | 46.3 | | 33.0 | | | |
| | Do | 6 | 60.7 | 0.68 | 31.3 | | | |
| | Do | 10 | 77.5 | | 28.8 | | | |
| | Do | 15 | 88.4 | | 27.2 | | | |
| | Do | 30 | 97.1 | | 25.4 | | | |
| | Do | 45 | 98.4 | | 25.0 | | | |
| | Do | 80 | 98.5 | 0.99 | 25.0 | 36.4 | 47.5 | 16.1 |
| 5 | Hexane | 2 | 10.6 | 0.24 | 23.8 | | | |
| | Do | 4 | 21.6 | | 26.0 | | | |
| | Do | 8 | 40.2 | 0.50 | 26.9 | | | |
| | Do | 12 | 54.8 | | 27.0 | | | |
| | Do | 20 | 73.6 | 0.80 | 26.6 | | | |
| | Do | 30 | 85.5 | | 26.0 | | | |
| | Do | 60 | 93.4 | | 25.4 | | | |
| | Do | 90 | 94.2 | 0.98 | 25.0 | 37.4 | 47.2 | 15.4 |
| 6 | Toluene | 0.33 | 12.1 | 0.19 | 36.2 | | | |
| | Do | 0.67 | 22.2 | | 36.4 | | | |
| | Do | 1.08 | 32.6 | 0.25 | 35.6 | | | |
| | Do | 1.5 | 41.6 | | 34.7 | | | |
| | Do | 2.5 | 56.8 | 0.43 | 32.8 | | | |
| | Do | 4 | 70.4 | | 31.0 | | | |
| | Do | 8 | 88.6 | | 27.7 | | | |
| | Do | 12 | 95.8 | | 26.2 | | | |
| | Do | 20 | Quant. | 0.21 | 25.0 | 32.9 | 41.6 | 25.5 |

[1] Determined by refractive index; also determined by ultraviolet analysis in Runs 4 and 5 (end products only). Results: Run 4, 25.6%; Run 5, 25.8%. There was no detectable polystyrene in end products from Runs 4, 5 and 6.

The data show that polymers recovered from reaction in toluene were liquids, as evidenced by the low inherent viscosities, whereas the other products were rubbers (Runs 1 and 2, and end products from Runs 4 and 5). The data also show that the polymerization rate was most rapid with toluene, then cyclohexane, and finally hexane. In the rate studies made for the copolymerization of butadiene with styrene, a very significant difference between the three diluents is illustrated in the inherent viscosity change with increasing conversion. Viscosity increase for polymers made in cyclohexane and hexane are nearly identical straight line functions. In toluene the inherent viscosity was greatest at about 57 percent conversion and decreased to yield a very low molecular weight (liquid) polymer at quantitative conversion.

EXAMPLE II

Butadiene was polymerized in a series of runs in the presence of cyclohexane and toluene as diluents and also mixtures of these compounds. The following recipe was used:

| | Parts by wt. |
|---|---|
| 1,3-butadiene | 100 |
| Diluent | 800 |
| n-Butyllithium | 0.10 (1.5 mmoles) |
| Potassium tert-butoxide | 0.01 (0.1 mmoles) |
| Li/K mole ratio (based on materials charged) | 15/1 |
| Temperature, °F. | 158 |
| Time, hours | 2 |

Results are presented in Table II.

TABLE II

| Run No. | Cyclohexane/Toluene, Weight Ratio | Conv., percent | Viscosity | | Microstructure, percent | | |
|---|---|---|---|---|---|---|---|
| | | | Inherent | Poise [1] | Cis | Trans | Vinyl |
| 1 | 100/0 | Quant. | 2.43 | | 42.4 | 46.2 | 11.4 |
| 2 | 80/20 | Quant. | 0.63 | | 35.8 | 45.5 | 18.7 |
| 3 | 60/40 | 95 | 0.31 | 904 | 29.9 | 44.0 | 26.2 |
| 4 | 40/60 | 98 | 0.23 | 292 | 28.1 | 43.8 | 18.3 |
| 5 | 20/80 | 83 | 0.20 | 176 | 26.2 | 42.3 | 10.5 |
| 6 | 0/100 | Quant. | 0.18 | 97 | 30.1 | 40.9 | 19.2 |

[1] Determined at 25° C.

These data show that the polymer viscosity decreased as the toluene concentration was increased. The polymer recovered from Run 1 was a rubber and that from Run 2 was a soft, sticky material. The other products were liquids.

EXAMPLE III

Runs were conducted in which butadiene and isoprene were homopolymerized, and butadiene was copolymerized with styrene, in the presence of a catalyst formed on mixing n-butyllithium with potassium tert-butoxide (the potassium salt of butyl alcohol). Toluene was employed as the diluent. A control run was conducted for the polymerization of butadiene using cyclohexane as the diluent. The recipes were as follows:

| | 1 | 2 | 3 | 4 |
|---|---|---|---|---|
| 1,3-butadiene, parts by weight | 100 | | 75 | 100 |
| Isoprene, parts by weight | | 100 | | |
| Styrene, parts by weight | | | 25 | |
| Toluene, parts by weight | 860 | 860 | 860 | |
| Cyclohexane, parts by weight | | | | 800 |
| n-Butyllithium, mmoles | 2.0 | 2.0 | 2.5 | 1.5 |
| Potassium tert-butoxide, mmole | ([1]) | ([1]) | ([1]) | 0.1 |
| Assumed scavenger (BuLi), mmole | 1.0 | 1.0 | 1.0 | 0.5 |
| Temperature, °F. | 122 | 122 | 122 | 122 |
| Time, hours | 6 | 6 | 6 | 6 |

[1] Variable.

Toluene was charged first, followed by the monomer(s), n-butyllithium, and then the potassium tert-butoxide. All reactions were carried out in an atmosphere of nitrogen. Based on prior experience, the butyllithium scavenger level was estimated as indicated in the foregoing recipes. The polymerizations were all terminated with a solution of 2,2′-methylene-bis(4-methyl-6-tert-butylphenol) in a 50/50 volume mixture of toluene and isopropyl alchol, using an amount sufficient to provide approximately one part by weight of the phenolic antioxidant per 100 parts by weight of polymer. Polymers were recovered by evaporation of the diluent. Data are presented in Table III.

TABLE III

| KO-t-Bu, Mmoles | Effective Li/K, Mole Ratio | Inherent Viscosity | Microstructure, percent | | |
|---|---|---|---|---|---|
| | | | Cis | Trans | Vinyl |
| POLYBUTADIENE (RECIPE 1) | | | | | |
| 0 | --- | 1.69 | 45.3 | 45.3 | 9.4 |
| 1.0 | 1/1 | 0.18 | 22.1 | 42.8 | 35.1 |
| 0.5 | 2/1 | 0.18 | 26.9 | 36.6 | 36.5 |
| 0.25 | 4/1 | 0.18 | 26.6 | 39.0 | 34.4 |
| 0.10 | 10/1 | 0.37 | 31.0 | 44.9 | 24.1 |
| POLYBUTADIENE CONTROL (RECIPE 4) | | | | | |
| 0.1 | 10/1 | 1.73 | 38.9 | 49.3 | 11.8 |
| POLYISOPRENE (RECIPE 2) | | | | | |
| 0 | --- | 1.08 | 91.0 | --- | [1] 9.0 |
| 1.0 | 1/1 | 0.05 | 66.2 | --- | [1] 33.8 |
| 0.5 | 2/1 | 0.05 | 62.6 | --- | [1] 37.4 |
| 0.25 | 4/1 | 0.07 | 67.2 | --- | [1] 32.8 |
| 0.10 | 10/1 | 0.32 | 86.7 | --- | [1] 13.3 |
| BUTADIENE/STYRENE COPOLYMERS (RECIPE 3) | | | | | |
| 0.15 | 10/1 | --- | 37.9 | 33.5 | 28.6 |
| 0.10 | 15/1 | 0.28 | --- | --- | --- |
| 0.075 | [2] 20/1 | --- | 30.7 | 41.9 | 27.4 |
| 0.060 | 25/1 | 0.32 | --- | --- | --- |
| 0.050 | [2] 30/1 | 0.36 | 30.7 | 46.0 | 23.3 |

[1] 3,4-addition.
[2] Analysis showed no polystyrene was present.
KO-t-Bu=potassium tert-butoxide.

The data show that polymers prepared in the presence of the butyllithium/potassium tert-butoxide catalyst, using toluene as the diluent, had very low inherent viscosities. They were low molecular weight liquid polymers. Polymers prepared with butyllithium alone had higher inherent viscosities. The control run, in which cyclohexane was used as the diluent, had a much higher molecular weight (inherent viscosity) than polymers prepared in the presence of the alkyl aromatic diluent.

EXAMPLE IV

Butadiene was polymerized in a series of runs using toluene as the diluent and a catalyst formed on mixing n-butyllithium with potassium tert-butoxide. The amounts of the catalyst ingredients were varied but the ratio was held constant. The recipe was as follows:

1,3-butadiene, parts by weight _____ 100
Toluene, parts by weight _____ 860
Potassium tert-butoxide, mmoles _____ variable
Assumed scavenger (BuLi), mmole _____ variable
n-Butyllithium, mmoles _____ 0.7
Temperature, °F. _____ 122
Time, hours _____ 3
Conversion, percent _____ quantitative The procedure was the same as described in Example III. Data are presented in Table IV.

TABLE IV

| Run No. | BuLi, Mmoles | KO-t-Bu, Mmoles | Effective BuLi Level, Mmoles | Effective Li/K, Mole Ratio | Inh. Visc. |
|---|---|---|---|---|---|
| 1 | 1.0 | 0.6 | 0.3 | 0.5/1 | 0.24 |
| 2 | 2.0 | 2.6 | 1.3 | 0.5/1 | 0.16 |
| 3 | 5.0 | 9.4 | 4.3 | 0.5/1 | 0.11 |
| 4 | 10.0 | 19.6 | 9.3 | 0.5/1 | 0.09 |

Liquid polymers were obtained in all runs. The data show that liquid polymers can be obtained even though the effective butyllithium is reduced to a low level.

EXAMPLE V

The following recipe was employed for the polymerization of the butadiene at variable temperature:

1,3-butadiene, parts by weight _____ 100
Toluene, parts by weight _____ 860
n-Butyllithium, mmole _____ 1.0
Potassium tert-butoxide, mmole _____ 0.6
Assumed scavenger (BuLi), mmole _____ 0.7
Effective Li/K mole ratio _____ 0.5/1
Temperature, °F. _____ variable
Time, hours _____ variable
Conversion, percent _____ quantitative Results are presented in Table V.

TABLE V

| Run No. | Temperature, °F. | Time, hours | Inh. Visc. |
|---|---|---|---|
| 1 | 41 | 24 | 0.14 |
| 2 | 86 | 24 | 0.15 |
| 3 | 122 | 3 | 0.16 |
| 4 | 158 | 1 | 0.13 |

The data show that liquid polymers were obtained in all cases.

EXAMPLE VI

Butadiene was polymerized in the presence of a catalyst formed on mixing n-butyllithium with tert-butoxides of sodium, potassium, rubidium and cesium. Toluene was employed as the diluent. The recipe was as follows:

1,3-butadiene, parts by wt. _____ 100
Toluene, parts by wt. _____ 860
n-Butyllithium, mmoles _____ 0.064 (1.0 mmole)
Alkali metal tert-butoxide _____ variable
Temperature, °F. _____ 122
Time, hours _____ 3
Conversion, percent _____ quantitative Results are presented in Table VI.

TABLE VI

NaO-t-Bu (Scavenger, 0.7 mmole BuLi)

| Run No. | MO-t-Bu, Mmoles | Effective Li/M, Mole Ratio | Inh. Visc. | Microstructure, Percent | | |
|---|---|---|---|---|---|---|
| | | | | Cis | Trans | Vinyl |
| 1 | 1.0 | 0.3/1 | 0.82 | 21.1 | 23.5 | 55.4 |
| 2 | 0.50 | 0.6/1 | 0.81 | 20.0 | 23.5 | 56.5 |
| 3 | 0.25 | 1.2/1 | 0.99 | 22.5 | 25.2 | 52.3 |
| 4 | 0.17 | 1.8/1 | 1.25 | 23.4 | 28.3 | 48.3 |
| 5 | 0.10 | 3/1 | 1.10 | 21.7 | 30.8 | 47.5 |
| 6 | 0.05 | 6/1 | 1.37 | 24.1 | 37.8 | 38.1 |

KO-t-Bu (Scavenger, 0.6 mmole BuLi)

| 7 | 1.0 | 0.4/1 | 0.16 | 20.8 | 43.4 | 35.8 |
| 8 | 0.50 | 0.8/1 | 0.20 | 22.5 | 38.9 | 38.6 |
| 9 | 0.25 | 1.6/1 | 0.19 | 23.0 | 38.7 | 38.3 |
| 10 | 0.10 | 4/1 | 0.25 | 22.9 | 44.3 | 32.8 |
| 11 | 0.05 | 8/1 | 0.33 | 28.7 | 44.7 | 26.6 |
| 12 | 0.02 | 20/1 | 0.53 | 28.5 | 49.6 | 21.9 |

RbO-t-Bu (Scavenger, 0.7 mmole BuLi)

| 13 | 1.0 | 0.3/1 | 0.13 | 18.1 | 44.2 | 37.7 |
| 14 | 0.50 | 0.6/1 | 0.14 | 27.4 | 35.6 | 37.0 |
| 15 | 0.25 | 1.2/1 | 0.13 | 25.6 | 38.5 | 35.9 |
| 16 | 0.10 | 3/1 | 0.20 | 26.8 | 42.7 | 30.5 |
| 17 | 0.05 | 6/1 | 0.36 | 29.8 | 47.9 | 22.3 |
| 18 | 0.02 | 15/1 | 0.32 | 29.6 | 47.2 | 23.2 |

CsO-t-Bu (Scavenger, 0.7 mmole BuLi)

| 19 | 2.0 | 0.15/1 | 0.14 | 24.3 | 38.3 | 37.4 |
| 20 | 1.0 | 0.3/1 | 0.11 | 27.5 | 32.7 | 39.8 |
| 21 | 0.50 | 0.6/1 | 0.15 | 28.9 | 34.7 | 36.4 |
| 22 | 0.20 | 1.5/1 | 0.22 | 28.1 | 39.6 | 32.3 |
| 23 | 0.10 | 3/1 | 0.34 | 31.0 | 44.1 | 24.9 |
| 24 | 0.04 | 8/1 | 0.37 | 31.0 | 45.3 | 23.7 |

M=alkali metal (Na, K, Rb, Cs).

These data show that low inherent viscosity polymers were obtained in all runs in which tert-butoxides of potassium, rubidium, and cesium were used. When sodium tert-butoxide was employed, the products had much higher inherent viscosities and were not liquids. They also had a much higher vinyl content than the other polymers.

EXAMPLE VII

Runs were conducted in which butadiene was polymerized in the presence of a catalyst formed on mixing n-butyllithium with phenylpotassium. The diluent was toluene. The following recipe was used:

| | |
|---|---|
| 1,3-butadiene, parts by weight | 100 |
| Toluene, parts by weight | 860 |
| n-Butyllithium, mmole | variable |
| Phenylpotassium, mmole | variable |
| Total initiator (BuLi+φK), mmole | 1.0 |
| Temperature, °F. | 122 |
| Time, hours | 3 |
| Conversion, percent | quantitative |

Results are presented in Table VII.

TABLE VII

| Run No. | BuLi, Mmole | φK, Mmole | Li/K, Mole Ratio | Inh. Visc. | Microstructure, Percent | | |
|---|---|---|---|---|---|---|---|
| | | | | | Cis | Trans | Vinyl |
| 1 | 0.33 | 0.67 | 0.5/1 | 0.11 | 15.5 | 45.7 | 38.8 |
| 2 | 0.67 | 0.33 | 2/1 | 0.13 | 23.4 | 45.0 | 31.6 |
| 3 | 0.83 | 0.17 | 5/1 | 0.17 | 21.6 | 44.4 | 34.0 |
| 4 | 0.91 | 0.09 | 10/1 | 0.18 | 25.4 | 41.5 | 33.1 |

The data show that all polymers had very low inherent viscosities.

EXAMPLE VIII

The following recipe was employed for the polymerization of butadiene using variable amounts of toluene as the diluent:

| | |
|---|---|
| 1,3-butadiene, parts by wt. | 100 |
| Toluene, parts by wt. | variable |
| n-Butyllithium, mmoles | 0.064 (1.0 mmole) |
| Potassium tert-butoxide | 0.067 (0.6 mmole) |
| Temperature, °F. | 122 |
| Time, hours | 3 |
| Conversion, percent | 100 |

Results are presented in Table VIII.

TABLE VIII

| Run No. | Toluene, parts | Inh. Visc. |
|---|---|---|
| 1 | 1,000 | 0.16 |
| 2 | 860 | 0.18 |
| 3 | 500 | 0.21 |
| 4 | 300 | 0.25 |

Liquid polymers were obtained in all cases. The inherent viscosity was lowered as the amount of toluene was increased.

EXAMPLE IX

Benzene was employed as the diluent for the polymerization of butadiene and the copolymerization of butadiene with styrene in the presence of a catalyst system formed on mixing n-butyllithium with potassium tert-butoxide. The recipes were as follows:

| | Parts by Weight (Mmoles) | |
|---|---|---|
| 1,3-butadiene | 75 | 100 |
| Styrene | 25 | |
| Benzene | 880 | 880 |
| n-Butyllithium | 0.173 (2.7) | 0.173 (2.7) |
| Potassium tert-butoxide | Variable | Variable |
| Assumed scavenger (BuLi) | 0.141 (2.2) | 0.141 (2.2) |
| Temperature, °F | 122 | 122 |
| Time, hours | 6 | 6 |
| Conversion, percent | 100 | 100 |

Data are presented in Table IX.

TABLE IX

| KO-t-Bu, Mmole | Effective Li/K, Mole Ratio | Inh. Visc. | Polystyrene, Weight Percent | Microstructure, Percent | | |
|---|---|---|---|---|---|---|
| | | | | Cis | Trans | Vinyl |
| BUTADIENE/STYRENE COPOLYMERS | | | | | | |
| 0.15 | 3.3/1 | 1.04 | 0 | 29.5 | 44.1 | 26.4 |
| 0.05 | 10/1 | 1.03 | 0 | 36.2 | 49.1 | 14.7 |
| 0.03 | 17/1 | 1.16 | 0 | 35.5 | 46.3 | 18.2 |
| POLYBUTADIENE | | | | | | |
| 0.15 | 3.3/1 | 1.16 | | 31.1 | 44.0 | 24.9 |
| 0.05 | 10/1 | 1.25 | | 36.0 | 46.2 | 17.8 |
| 0.03 | 17/1 | 1.23 | | 37.2 | 47.0 | 15.8 |

These data show that when benzene is employed as the diluent, the products are rubbers rather than liquids.

Liquid products are obtained by the polymerization of conjugated dienes alone or in admixture with another conjugated diene or vinyl-substituted aromatic hydrocarbon in the presence of a catalyst formed on mixing (1) an organolithium compound, and (2) an organic compound of an alkali metal selected from the group consisting of potassium, rubidium, and cesium, if at least 30 weight percent of the diluent employed is an alkyl-substituted aromatic hydrocarbon.

Catalysts formed on mixing an organolithium compound with an organic compound of an alkali metal can be employed for the production of conjugated diene homopolymers and random copolymers of conjugated dienes with vinyl-substituted aromatic hydrocarbons. This process is described in a copending application of C. F. Wofford, Ser. No. 323,567, filed Nov. 14, 1963. In organometallic catalyst systems, it is common practice to regulate the molecular weight of the polymers by suitable adjustment of catalyst concentration. As the catalyst level is increased, the molecular weight of the polymer is decreased. When it is desired to prepare liquid polymers, very high catalyst levels are generally required.

The present invention resides in the discovery that liquid polymers can be prepared through proper choice of the polymerization diluent without the necessity for using the high catalyst levels that are ordinarily required. Broadly speaking, the polymerization process of this invention comprises the step of contacting in a polymerization zone a conjugated diene, either alone or in admixture with another conjugated diene or a vinyl-substituted aromatic hydrocarbon, with a catalyst which forms on mixing (1) an organolithium compound, and (2) an organic compound of potassium, rubidium, or cesium, and conducting the polymerization in the presence of a diluent comprising at least 30 weight percent of an alkyl-substituted aromatic hydrocarbon. The total diluent can be an alkyl-substituted aromatic hydrocarbon or it can be used in admixture with a paraffinic and/or a cycloparaffinic hydrocarbon. By the process of this invention, liquid polymers of very low molecular weight can be easily prepared when the concentration of the organolithium component charged to the polymerization is no greater than is frequently utilized for the production of rubbery polymers. Since there are generally small amounts of impurities in the diluent and/or monomers, a portion of the organolithium compound serves as a scavenger with the remainder being utilized as an active initiator component.

The alkyl-substituted aromatic hydrocarbons preferred as diluents are the alkyl-substituted benzenes containing from 1 to 4 alkyl groups per molecule with the total number of carbon atoms in the alkyl groups not to exceed 8. Examples of these compounds include toluene, xylenes, 1,2,3-trimethylbenzene, 1,2,4-trimethylbenzene, 1,3,5-trimethylbenzene, 1,2,4,5 - tetramethylbenzene, 1-methyl-2-ethylbenzene, 2,4-diethylbenzene, ethylbenzene, isopropylbenzene, 1,4 - di-n-propylbenzene, 1,4-dimethyl-3-isopropylbenzene, 1-ethyl-2,5-di-n-propylbenzene, tert-butylbenzene, n-butylbenzene, 1,3-di-n-butylbenzene, amylbenzene, 1-amyl-2-isopropylbenzene, 1,2-dimethyl-4-n-hexylbenzene, and n-octylbenzene. As hereinbefore stated, the alkyl-substituted aromatic hydrocarbon can serve as the total diluent or it can be employed in admixture with aliphatic and cycloaliphatic hydrocarbon diluents. In the case of mixed diluents, at least 30 weight percent of the mixture is the alkyl-substituted aromatic hydrocarbon. As the quantity of alkyl-substituted aromatic hydrocarbon in the diluent mixture is increased, the molecular weight of the polymer is decreased. While this invention is not based upon any particular reaction mechanism, it is believed that the alkyl-substituted aromatic hydrocarbon functions as a chain transfer agent and thereby makes possible the production of low molecular weight polymers.

The amount of the organolithium compound employed in forming the catalyst system will generally be in the range of 0.2 to 100 milliequivalents per 100 parts by weight of total monomers charged (e.g., gram milliequivalents per 100 grams of total monomers charged) with from 0.3 to 15 milliequivalents of organolithium compounds per 100 parts by weight of monomer being preferred. In many instances an amount of organolithium compound less than 3 milliequivalents, often less than 2 milliequivalents, per 100 parts by weight of monomers charged gives the desired results.

Reasonable variations and modifications of this invention can be made, or followed, in view of the foregoing, without departing from the spirit or scope thereof.

I claim:

1. A process for preparing liquid conjugated diene polymers which comprises contacting a monomeric material selected from the group consisting of (1) at least one conjugated diene and (2) a mixture of a conjugated diene and a vinyl-substituted aromatic hydrocarbon in which said vinyl group is attached to a nuclear carbon atom, with a catalyst which forms on mixing materials comprising (a) an organolithium compound having the formula $R(Li)_x$ wherein R is a hydrocarbon radical selected from the group consisting of aliphatic, cycloaliphatic and aromatic radicals and $x$ is an integer from 1 to 4, inclusive, and (b) an organic compound selected from the group consisting of compounds having the following formulas:

(1) R'M
(2) R'(YM)$_n$
(3) 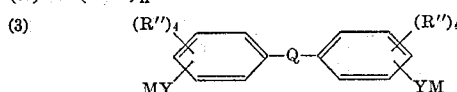
(4) 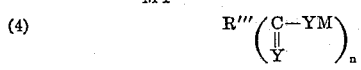
(5) 

and (6) 

wherein R' is selected from the group consisting of aliphatic, cycloaliphatic and aromatic radicals, M is an alkali metal selected from the group consisting of potassium, rubidium and cesium, R'' is selected from the group consisting of hydrogen, and aliphatic, cyclophatic and aromatic radicals, Q is selected from the group consisting of

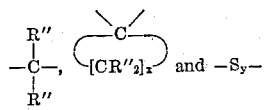

radicals where R'' is as defined above, $x$ is an integer from 4 to 5, inclusive, and $y$ is an integer from 1 to 3, inclusive, R''' is selected from the group consisting of aliphatic, cycloaliphatic and aromatic radicals, Y is selected from the group consisting of oxygen and sulfur, and $n$ is an integer from 1 to 3, inclusive, in the presence of a diluent comprising at least 30 weight percent of an alkyl-substituted aromatic hydrocarbon.

2. A process according to claim 1 in which said monomeric material is 1,3-butadiene.

3. A process according to claim 1 in which said monomeric material is isoprene.

4. A process according to claim 1 in which said monomeric material is a mixture of 1,3-butadiene and styrene.

5. A process according to claim 1 in which said monomeric material is a mixture of isoprene and styrene.

6. A process according to claim 1 in which said monomeric material is a mixture of 1,3-butadiene and 3-methylstyrene.

7. A process for preparing liquid conjugated diene polymers which comprises contacting in a polymerization zone a monomeric material selected from the group consisting of (1) at least one conjugated diene containing from 4 to 12 carbon atoms per molecule and (2) a mixture of a conjugated diene containing from 4 to 12 carbon atoms per molecule and a vinyl-substituted aromatic hydrocarbon in which said vinyl group is attached to a nuclear carbon atom with a catalyst which forms on mixing materials comprising (a) an organolithium compound having the formula $R(Li)_x$, wherein R is a hydrocarbon radical selected from the group consisting of aliphatic, cycloaliphatic and aromatic radicals containing from 1 to 20 carbon atoms and $x$ is an integer from 1 to 4, inclusive, and (b) an organic compound selected from the group consisting of compounds having the following formulas:

(1) R'M
(2) R'(YM)$_n$
(3) 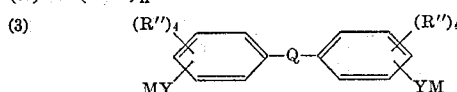
(4) 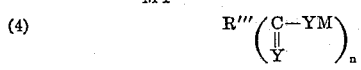
5) 

and (6) 

wherein R' is selected from the group consisting of aliphatic, cycloaliphatic and aromatic radicals containing from 1 to 20 carbon atoms, M is an alkali metal selected from the group consisting of potassium, rubidium and cesium, R'' is selected from the group consisting of hydrogen, and aliphatic, cycloaliphatic and aromatic radicals containing from 1 to 6 carbon atoms, Q is selected from the group consisting of

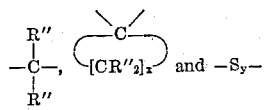

radicals where R'' is as defined before, $x$ is an integer from 4 to 5, inclusive, and $y$ is an integer from 1 to 3, inclusive, R''' is selected from the group consisting of aliphatic, cycloaliphatic and aromatic radicals containing from 4 to 20 carbon atoms, Y is selected from the group consisting of oxygen and sulfur, and $n$ is an integer from 1 to 3, inclusive, said contacting occurring at a temperature in the range of −80 to 150° C. and in the presence of a diluent comprising at least 30 weight percent of an alkyl-substituted aromatic hydrocarbon; and recovering a conjugated diene polymer.

8. A process according to claim 7 in which the amount of said organolithium compound is in the range of 0.2 to 100 milliequivalents of organolithium compound per 100 parts by weight of monomeric material, and the relative quantities of said organolithium compound and said organic compound is in the range of 0.15 to 30 equivalents of organolithium compound (based on lithium) atoms per equivalent of organic compound.

9. A process according to claim 7 in which the amount of said organolithium compound is in the range of 0.3 to 15 milliequivalents of organolithium compound per 100 parts by weight of monomeric material, and the relative quantities of said organolithium compound and said organic compound is in the range of 0.15 to 25 equivalents of organolithium compound (based on lithium atoms) per equivalent of organic compound and said contacting occurs at a temperature in the range of −20 to 80° C.

10. A process according to claim 7 in which said catalyst is one which forms on mixing materials consisting essentially of n-butyllithium and potassium tert-butoxide.

11. A process according to claim 7 in which said catalyst is one which forms on mixing materials consisting essentially of n-butyllithium and phenylsodium.

12. A process according to claim 7 in which said catalyst is one which forms on mixing materials consisting essentially of n-butyllithium and potassium salt of stearic acid.

13. A process according to claim 7 in which said catalyst is one which forms on mixing materials consisting essentially of n-butyllithium and potassium salt of di-n-butylamine.

14. A process according to claim 7 in which said catalyst is one which forms on mixing materials consisting essentially of n-butylllithium and potassium salt of 2,6-di-tert-butyl-4-methylphenol.

15. A process according to claim 7 in which said catalyst is one which forms on mixing materials consisting essentially of n-butyllithium and potassium salt of 2,2'-methylene-bis(4-methyl-6-tert-butylphenol).

16. A process according to claim 7 in which said catalyst is one which forms on mixing materials consisting essentially of n-butyllithium and a potassium salt of tert-dodecylmercaptan.

17. A process according to claim 1 wherein said alkyl-substituted aromatic hydrocarbon diluent is in admixture with an aliphatic hydrocarbon.

18. A process according to claim 1 wherein said alkyl-substituted aromatic hydrocarbon diluent is in admixture with a cycloaliphatic hydrocarbon.

19. A process according to claim 1 wherein said diluent is an alkyl-substituted benzene containing 1 to 4 alkyl groups per molecule with the total number of carbon atoms in the alkyl groups not exceeding 8.

References Cited

UNITED STATES PATENTS 3,294,768  12/1966  Wofford _____ 260—83.7

DELBERT E. GANTZ, *Primary Examiner.*

C. R. DAVIS, *Assistant Examiner.*